United States Patent [19]

Dudley

[11] 4,358,236
[45] Nov. 9, 1982

[54] DE-PALLETIZING/PALLETIZING APPARATUS FOR CANS AND CAN-TYPE CONTAINERIZATIONS

[76] Inventor: Robert G. Dudley, P.O. Box 1731, Monterey, Calif. 92940

[21] Appl. No.: 76,171

[22] Filed: Sep. 17, 1979

[51] Int. Cl.³ ............................................. B65G 59/04
[52] U.S. Cl. .................................... 414/96; 198/690; 414/118; 414/122
[58] Field of Search ............... 414/117, 118, 120, 121, 414/122, 124, 112, 113, 96, 42, 74, 75, 119, 114; 198/690

[56] References Cited

U.S. PATENT DOCUMENTS

| | | | |
|---|---|---|---|
| 3,181,712 | 5/1965 | VonGal, Jr. | 414/96 X |
| 3,215,289 | 11/1965 | Gleason | 414/122 |
| 3,327,872 | 6/1967 | Madden | 414/119 |
| 3,338,374 | 8/1967 | Dudley | 198/690 |
| 3,866,763 | 2/1975 | Alduk | 414/96 X |

FOREIGN PATENT DOCUMENTS

| | | | |
|---|---|---|---|
| 880138 | 9/1971 | Canada | 198/690 |
| 2222678 | 4/1973 | Fed. Rep. of Germany | 414/122 |

Primary Examiner—Leslie J. Paperner
Attorney, Agent, or Firm—Emrich, Lee, Brown & Hill

[57] ABSTRACT

Cans are unloaded from pallets, utilizing an overhead first magnet which attracts the can units and holds them against the intercepting underside of a rotationally moving belt so as to be transported thereby to a station where the cans as they pass out of the influence of the first magnet are introduced to the influence of a second magnet which intercepts, guides and positively controls what would otherwise be the cans free-fall travel onto a conveyor which then delivers the cans enfile to a receptive station which has a positive requirement for this controlled can alignment.

13 Claims, 4 Drawing Figures

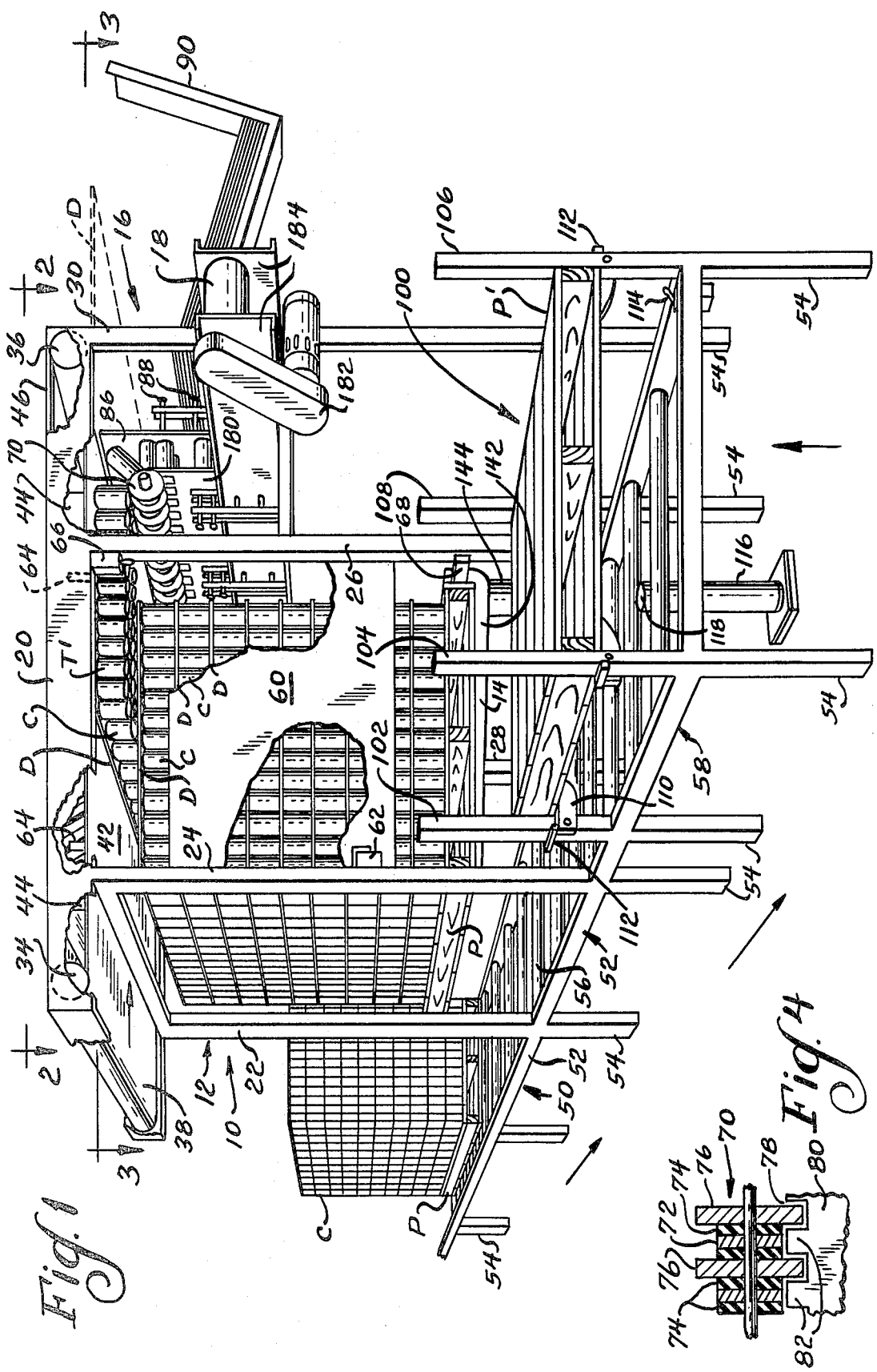

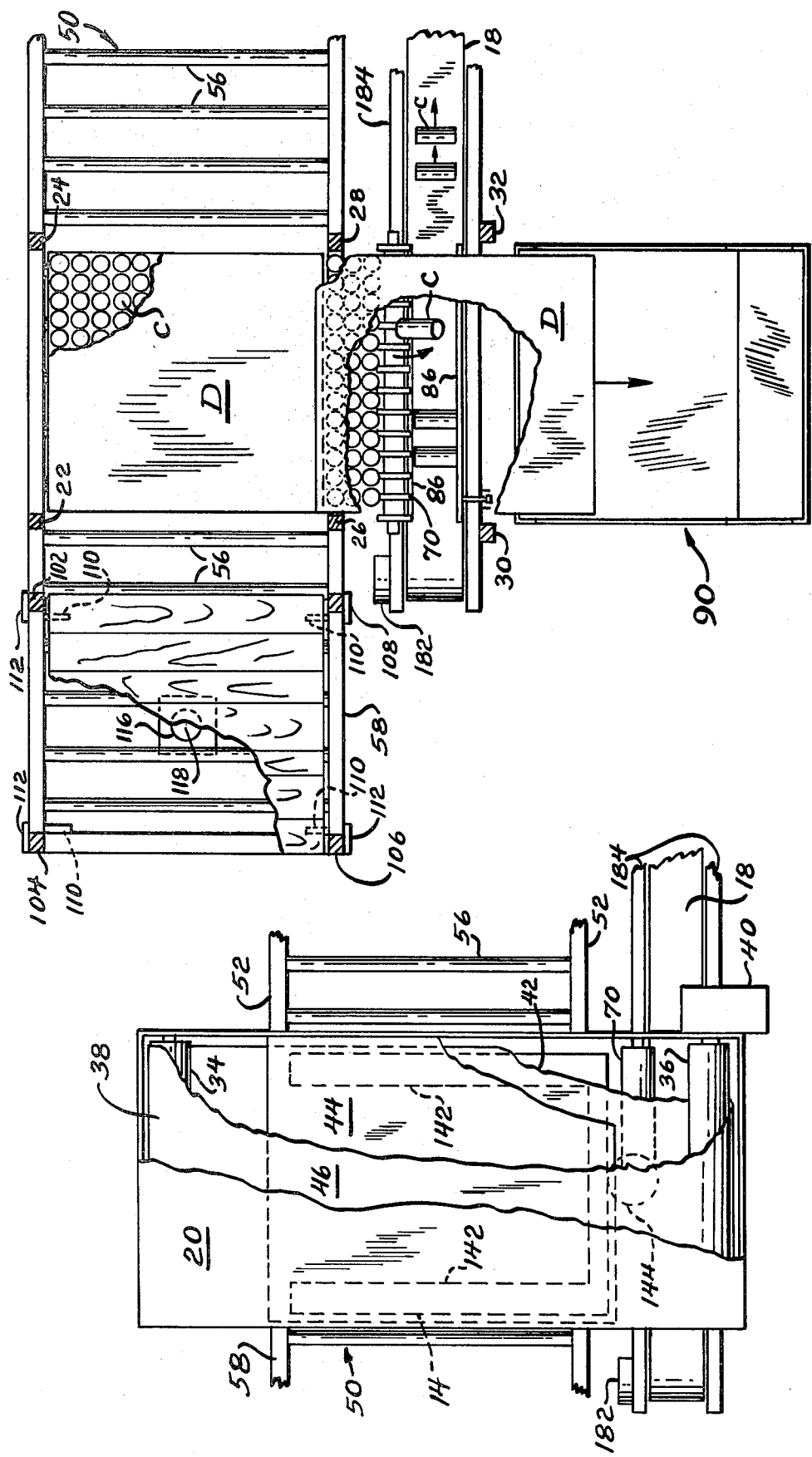

DE-PALLETIZING/PALLETIZING APPARATUS FOR CANS AND CAN-TYPE CONTAINERIZATIONS

FIELD OF THE INVENTION

This invention relates to apparatus useful for transferring and unloading "cans" from pallets on which they have been stacked in layered tiers, frequently with separating divider sheets between the tiers.

The term "cans" as used hereinafter, both in the description of the invention and the claims, has reference to package containerizations composed in whole or in part of magnetic field reactive materials such as tin plate steel bodies, bands, lid rims, etc. and commonly referred to as cans.

SUMMARY OF THE INVENTION

A principal object of the invention is to provide such apparatus which is capable of operating at increased speed with reduced energy output and while maintaining gentle positive control over the canned, packaged product or container so as to be effective in reducing damage and loss of the container or product(s) therein.

A companion object of the invention is to provide such apparatus which is both simple in construction and effective in operation.

A more specific object of the invention is to provide apparatus capable of transferring/unloading cans from a pallet on which they have been stacked in layered tiers, each tier comprising several patterned rows of cans per layer, delivering the "cans", row-by-row, and controlling the otherwise free-fall of the row by fanning down each successive row enfile to a receiving station requiring such controlled can-convoy. Examples of a receiving station are labeling machines, casing machinery, product fillers or other specified work areas of operation.

A futher object of the invention is to provide such apparatus which, when necessary, separate, discharge, and collect any divider sheets present between the can layers.

Still another object of the invention is to devise and include, as necessary, means capable of handling, discharging and restacking the empty pallets for reuse after being emptied of the layered cans.

In accordance with this invention, a pallet stacked with layered tiers of "cans", the tiers optionally being seperated by divider sheets, is detiered or unloaded of "cans" by in turn introducing the stacked, palleted cans (either manually on a conventional roller track or by a conventional powered conveyor) onto a lift. The lift is intermittently raised a distance equal to the increment height of each "can layer" so as to control and succesively locate the uppermost layer of each tier of "cans" of the palleted stack into proximal contact with the underside of a belt which is continually moving about a permanent magnet. As the pallet-base with its patterned layers of "cans" is elevated, the entire, upper-most layered tier enters the overhead magnetic field of the magnet, and adheres to the underside of the moving belt, providing positive separation of that upper-most layer from the next-below tier. The entire, collective, uppermost patterned tier of "cans", together with any optional, interlinear divider sheet is firmly transfixed by the magnet, against the underside of the moving belt, and moves in-toto beyond the pallet (and influence of the overhead magnet), to a row-by-row discharge point, where it enters the influence of a magnetized pulley as each row of cans is released from the overhead magnetic field.

As each row of cans in the uppermost tier moves beyond the influence of the overhead magnet the magnetized pulley attracts the row in a controlled fashion, fanning down the otherwise free-fall of the cans and discharging each row of cans under total control enfile onto strategically located conveyor lines which carry the cans to work areas requisite of high speed, uninterrupted enfiled can-convoy (casers, labelers, fillers, etc.)

As the final row of the upper most pattern tier clears the influence of the overhead magnet and is discharged under the control of the magnetic pulley, the pallet-stack elevates into the cleared space, and, without interruption, repeats the sequence with the next patterned layer of tiered cans.

Where the tiers of layered cans are separated by divider sheets, as the entire layer of cans moves with the belt, each divider sheet is transfixed between the top of the can layer and the underside of the belt, and moves in unison with the layer. As the layer is freed, row-by-row under the control of the magnetic pulley, the divider sheet is also freed and, floating free, falls to a collector bin, box or receptacle beyond the magnetic pulley and discharging conveyor of the enfile rows of "cans".

Once the last layer of "cans" has been effectively discharged and the pallet-base is empty, the now empty pallet-base is lowered back into its original starting position.

At this juncture, the next stacked and loaded pallet is on line (having been conveyed to the lift as aforedescribed) and its "in-put" effectively displaces the now emptied pallet-base from the lift directly onto a stacking storage area for reuse. As the empty pallet-base is displaced from the lift, it is replaced by the input of the stacked layers of palleted cans in lift position to recycle the continuous delayering process as described.

A feature of the invention is that the stacked can layer unloading operation proceeds continuously and in automatic fashion with a minimum energy requirement due to the simplicity of construction and the controlled interaction of the two described intercepting magnetic fields.

Another feature of the invention is that in the continuous magnetic-field-to-belt transfer depalletizing phase and in the fanning down, row-by-row discharging phase of the enfile can flow operation, the apparatus continuously retains positive control over the posture of the cans. Thus the line-flow operation is capable of proceeding smoothly and in continuous manner without damage to the containers or sensitive products therein which would otherwise be caused by "pile-up, drop-damage or stoppage of the discharging can flow".

Another feature of the invention is that the structural components of the apparatus are so arranged that the operation may be conducted in reverse where so required so as to received cans introduced "enfile" (as from labelers or canning room operations) and then to restack them in layered tiers onto pallets, row-by-row, while intermittently lowering the pallet-base, tier-by-tier so that when fully stacked, the stacked and palleted cans may be delivered to a storage, warehouse or packing/shipping area.

A further feature of the invention is that collecting stations for both the divider sheets and the empty pallet-basses are appropriately located to receive and separately stack the divider sheets and the empty pallets as they are separated from the can layers. This may be accomplished without any attention on the part of the operator whose primary function then consists of supervising the loading (in-coming) palleted stacked cans, for the lift.

Apparatus constructed in accordance with the invention portends great importance and usefulness for industries who must handle a vast volume of empty can/containers, can makers and suppliers as well as industries utilizing can/containers for their products, such as food processors, petroleums, chemicals, solvents, liquid gasses and pharmaceuticals and beverages.

Additional possibilities include enhanced handling of the industry practice of storing seasonally delivered food products and storing such fruits, vegetables, etc. unlabeled in warehouse (commonly know as "stacked bright"). For example, later, when appropriate labeling has been determined, as at the time of a buyers acceptance, the palleted stacks of cans may be depalletized by the apparatus comprising this invention so as to separate not only the can layers from the pallets but also to enfile the cans to the proper labeling machinery at energy efficient increased speed.

The invention also may be utilized to bring empty cans to the product line and present them in the proper posture enfile to high speed, high capacity filing equipment, thus increasing productivity at reduced cost.

Not only does the invention facilitate the filling of the "cans" with product at any given stage of can-line operations, but it considerably accelerates the enfile presentation of cans where high speed operation of the interfacing receptor machinery stations is appropriate or required. Thus it promotes increased production per unit per operation hour at a cost saving together with proportionate decrease in the losses attributed to container and product handling damage.

Many other objects, advantages or features of the invention will be apparent or will become so upon consideration of a preferred embodiment of the invention which now will be described in connection with the accompanying drawings.

DESCRIPTION OF THE DRAWINGS

FIG. 1 illustrates the presently preferred embodiment of a de-palletizer constructed in accordance with the invention;

FIG. 2 is a partially fragmented top plan view of the apparatus taken from lines 2—2 in FIG. 1 and looking downwardly in the direction indicated by the arrows; and FIG. 3 is a horizontal sectional view taken through the apparatus along lines 3—3 looking in the direction indicated by the arrows; and FIG. 4 is an enlarged fragmental view of the magnetized pully and can/row stripping control showing details in the construction thereof.

DETAILED DESCRIPTION

Referring now more specifically to the several views wherein like parts are identified by like reference numerals, FIG. 1 illustrates the invention embodied in a depalletizer indicated generally at 10. Said depalletizer 10 comprises a first or unloading station 12 containing an elevatable fork-lift 14 onto which pallets P containing tiers of cans C, optionally separated by divider sheets D, are individually fed from a feed rack 50 as when the lift 14 is in its lowered position level with or below the feed rack surface. Adjacent to said first station 12 is a second or can discharge station 16 containing a conveyor 18 onto which the cans C are released after being separated from pallet P in the unloading station 12 and transported enfile to a can labeling or filling station (not shown).

Extending across the upper reaches of both the can unloading station 12 and the can discharging station 16 is a frame 20. Said frame 20 is illustrated supported on two pairs of spaced uprights 22, 24 and 26, 28 which define the can unloading station 12 and a third pair of uprights 30, 32 which with 26, 28 define the can discharging station 16. The opposed ends, sides and top of frame 20 are closed and provide a dust cover which contains a pair of rotatably journaled pulleys 34, 36 at its opposed ends over which is disposed a continuous belt 38. One of said pulleys 36 is driven as by means 40 (FIG. 2) such that the lower course 42 of the belt moves across the width of the can receiving and unloading station 12 from beyond uprights 22, 24 and its fork lift 14 into the second or can discharge station 16 in continuous fashion and at a constant rate of speed during the can unloading and discharge operation. The underside of frame 20 is open so that the underside of the lower course 42 of the continuously moving belt 38 is exposed through its full length and width. Supported by the opposed sides of frame 20 is a magnetic means 44 shown horizontally disposed between the upper course 46 and aforementioned lower course 42 of the continuously moving belt 38. Said magnetic means 44 preferably comprises permanent magnets embedded in a rectangular block-shaped platen of laminated fiberglass and resin which may be readily kept clean and sanitary. As illustrated, the horizontally disposed magnetic platen 44 lies close to the lower course 42 of the belt and extends across the full breadth and width of station 12, and thereby the full breadth and width of the tiered stack of cans C mounted on the fork-lift 14. It also is illustrated as extending beyond the paired uprights 22-23 of the unloading station 12 (to one side of the stacked cans on the pallet P) across the unloading station 12 including the forklift 14 and into the upper reaches of the second or can discharge station 16 a distance as afterwards more particularly defined.

Referring still to FIG. 1, feed rack 50 is illustrated as comprising a rectangular frame supported on legs 54 at a convenient height. Between the longitudinal side pieces 52 of said frame are rotatably journaled regularly spaced, parallel disposed rollers 56 which facilitate feed of the loaded pallet P onto the forklift 14 when in its lowered position. The forklift 14 comprises at least two horizontally disposed tines 142 appropriately spaced and dimensioned so that in the lowered position of the forklift they lie in the sapces between the rollers 56 and below the plane of the feed rack as defined by its rollers 56 to facilitate feed of the can loaded pallets into said station and onto the tines of the fork lift 14 when in its lowered position. At 60 is a vertically disposed plate across the width of the loading station 12 between uprights 24 and 26 which serves as a stop against which the stock of cans C loaded on pallet P engages when pushed into the unloading station 12. Stop plate 60 thus serves as means to center the pallet P and its stacked cans on the forklift 14. Fixed in said stop plate 60 is a microswitch 62 positioned to be engaged by the stack of cans C when the pallet and its can load has moved into station 12 and against the stop plate. FIG. 1 illustrates said microswitch 62 located in the lower left hand corner of the stop plate 60. Closing of the microswitch 62 completes the circuit casing fluid from a supply source (not illustrated) to be delivered under pressure into the hydraulic cylinder 144 of the forklift 14 to effect raising of the fork lift 14 and thereby the can-loaded pallet in a vertical direction toward the lower course 42 of the overhead continuously moving belt 38. As the fork-lift 14 continues to raise its uppermost tier T' or layer of cans enters the magnetic field of the magnetic platen 44 positioned between the courses of the belt 38. As the upper most tier of cans C enters the magnetic field under the attraction of the magnet 44 the entire layer of cans will jump up causing the tops of the cans to firmly engage the underside of the moving belt and move therewith. Any divider sheet overlying the tier of cans will also be transfixed and held by the cans therebetween and the lower course 42 of the moving belt. Both the tier of cans C and the divider sheet D will therefor move with the lower course 42 of the moving belt into the adjacent can discharging station 16. As the cans C are thus drawn by magnetic means 44 against the lower course 42 of the moving belt 38, the lower course of the belt 38 is caused to engage and close microswitches 64 located at each of the four corners of the can receiving station 12, two of which switches are illustrated in FIG. 1. Closing of microswitches 64 interrupts the circuit closed by microswitch 62 to temporarily halt the elevation of the forklift 14 and the pallet P and its stack of cans C thereon.

As the cans lodged against the belt enter the can discharge station 16 the can rows are carried beyond the influence of the magnetic platen 44 and, as this occurs, they are released from the belt. The magnetic platen 44 is so dimensioned that it terminates short of the conveyor 18 wherefore each row of cans C is carried by the belt 38 beyond the magnetic platen 44 where the cans are released to the conveyor and are carried thereby to a work or other receiving area not shown.

It is a major feature of the invention that the thus released cans are not allowed to drop or free fall in random fashion onto the conveyor 18. Instead, as each row of the moving tier of cans is discharged from the magnetic influence of the platen 44, their lower ends come under the influence of the magnetic field of a second magnetic means which is moving downwardly and in a direction away from belt 38. Said second magnetic means is illustrated in FIG. 1 as comprising a pulley 70 which is continuously rotating about its axis located beneath the terminus of the magnetic platen 44 in the second station 16 at right angles to the direction of movement of the belt 38 and parallel to the direction of movement of the discharge conveyor 18.

Considering also FIGS. 3 and 4 with FIG. 1 pulley 70 will be understood as comprising a plurality of small diametered magnetic disks 72 each sandwiched between a pair of disks 74, of insulating plastic material, which assembly in turn is sandwiched between larger diametered metal disks 76. As illustrated in FIG. 4 the peripheral edge of disks 76 of larger diameter rotate through recesses 78 provided in the upper edge of vertically disposed stripper plate 80 located immediately below pulley 70. It will be thus understood that as each row of cans C is carried by the moving belt 38 beyond the magnetic influence of the magnetic platen 44 the cans are vertically disposed. However, as they are released from the belt and leave the influence of the magnetic platen 44, the lower ends of said cans enter the magnetic field of the magnets 72 so that they rotate with pulley by stripper plate 80, thus effectively being tilted out of their initial vertical disposition into the illustrated horizontal disposition. Thus each can as it rotates with the pulley 70 is engaged by the projecting portions 82 of the stripper plate 80 on either side of its recess 78 through which the periphery of the disks 76 rotate so that the cans are effectively stripped from the magnetic field (magnetic 72) of the pulley 70. As this occurs a spacer plate 86 (FIG. 1) cooperates with stripper plate 80 so that the horizontal disposition of the cans is maintained as they drop one by one into the receiving conveyor belt 18. In FIG. 1 suitable adjusting means are illustrated at 88 for adjusting the space therebetween to approximate the dimensions of the cans so that there will be sufficient play to allow essntially free fall but insufficient play to allow the cans to lose their horizontal disposition.

Still referring to FIG. 1, it will be understood also that as the tier of cans moves to the right of FIG. 1 with the belt 38 the divider sheet D which moves therewith is carried out of the second station beyond uprights 30, 32 as illustrated in phantom lines in FIG. 1 and into a collecting station 90 therefor. Thus, as each row of cans C leaves the influence of magnetic plate 44 and discharges to conveyor 18, its hold on divider sheet D is also relieved and, when the last row of cans has been released, the divider sheet has moved far enough that it is correctly positioned to drop into the illustrated collection station 90.

Also, as the last row of cans of each tier is carried by the belt into the second station and beyond the influence of the magnetic platen 44, the cans no longer cause the lower course of the belt to maintain the microswitches 64 closed. Of consequence, as the unloading of each tier of cans from the pallet P is completed, the hydraulic forklift 14 is caused to rise until the next uppermost layer or tier of cans has been lodged against the lower belt course 42 to interrupt elevation of the forklift 14 and the unloading process above described.

It will be further understood that as the pallet and its stack of cans is intermittently raised to locate each of its tiers of cans for unloading and discharge onto conveyor 18 for delivery to the can labeling, casing or filing machinery stations, means are also provided to effect return of the forklift 14 when the forklift 14 has been raised to a height sufficient to carry the last can tier into the magnetic field of the magnetic platen 44. Closing of the microswitch 66 effectively ports cylinder 144 of the forklift 14 and interrupts the circuit energized by closing microswitch 62, allowing the forklift 14 and pallet P to be returned under the force of gravity to its original lowered position. In this position the pallet P rests on the rollers 56 of the feed rack 50 and the tines of the fork lift 14 are disposed below the surface of the feed rack. The empty pallet P resting on the rollers of the feed rack in the lowered position of the forklift 14 is pushed by the input of a filled pallet onto an extension 58 of the feed rack 50 beyond the pallet unloading station 12 where it can be removed by the operator.

The invention, however, also contemplates that means may be provided for overhead storage of the pallet collection station 100 located above extension 58 of the feed rack 50.

Referring to said FIG. 1, said pallet collecting station 100 comprises four uprights 102, 104, 106 and 108 which define a storage area whose width and breath only slightly exceeds that of the pallets P. Each said supports 102–108 is provided with a pivotally mounted dog 110 located at a convenient height above feed rack extension 58 and facing inwardly into the pallet storage area defined by said four spaced uprights 102-108. Cooperating with said pivotally mounted dogs 110 are overhead stops 112 fixed to said uprights 102-110 so as to allow its associated pivotally mounted dog 110 to swing upwardly from its horizontal position but not in reverse. At 114 is a microswitch which is located so as to be engaged by the empty pallets P as each is pushed along feed rack extension 58 by the next pallet P pushed onto the forklift 14 in the unloading station 12. Engagement of switch 114 by the empty pallet P energizes a second hydraulic lift 116 whose upper end is normally located below the upper surface of the rack extension 58. With elevation of the lift 116, its upper end 118 engages the underside of the emptied pallet P' pushed onto extension 58 causing it to engage the four dogs 110 which swing upwardly about their pivotal connection 118 allowing the empty pallet P' to be raised thereabove, and to engage the pallet or pallets already supported on the dogs 110. The hydraulic cylinder 116 is cycled so that it rises to a height sufficient to raise pallet P' and the stored stack of empty pallets to a height above the dogs 110, which will allow them to return to their normal horizontal position as illustrated in FIG. 1. The lift 16 then reverses so as to return to its starting position and transfer its load of empty pallets onto the dogs as it drops therebelow.

From the above, it will be apparent that as each pallet stacked with cans is moved along rack 50 into the unloading station 12 to initiate the process, the operation of the apparatus thereafter proceeds automatically without further attention by the operator.

Thus to briefly summarize, as each can-loaded pallet is moved into the unloading station 12 and properly located onto the forklift 14, the forklift 14 is automatically energized causing it to elevate the can loaded pallet toward the overhead located moving belt 38. As each tier or layer of cans on the pallet P is raised by the forklift 14 into the magnetic filed of the magnet 44, it is pulled off the next below layer of cans and against the belt. The upward movement of the forklift 14 is temporarily interrupted and the cans comprising the tier and its divider sheet D are carried by the moving belt into the can discharge station 16. As each row of the can tier enters the can discharge station 16 it passes beyond the magnetic field of the magnet 44. However, as it leaves said magnetic field the bottom ends of the cans enter the magnetic field of the pulley 70 and are tilted thereby from their initial vertical disposition to a horizontal disposition, stripped from pulley 70 by stripper plate 80 and delivered thereby in cooperation with spacer plate 86 to the conveyor 18 onto which the cans are deposited one by one. It should be understood that by slightly inclining the axis on which the pulley 70 rotates, the cans of each row can be caused to drop sequentially one by one rather than all together. As each tier of cans is carried by the moving belt to the can discharge station 16, the overlying divider sheet D is also caught between the cans and the moving belt so that it is also carried by the moving belt and deposited into the depositor sheet collecting station 90 beyond the conveyor 18. Once the forklift 14 has been raised high enough to located its lowermost tier of cans into the magnetic field of the magnetic platens 44, the forklift engages a microswitch 66 so that the forklift is returned to its lowered or initial starting position with its tines between the level of the feed rack 50. Once the forklift has been returned to its lowered position the next pallet stacked with cans can be moved into the can unloading station 12 to continue the unloading process. As each can-loaded pallet is moved along the feed rack 50 onto the forklift 14, it also pushes the empty pallet P' out of said station 12 and onto rack extention 58 for overhead storage on dogs 110, thus providing room for the next empty pallet.

From the aforesaid description, it will be appreciated that all the recited objects, features and advantages of the invention have been demonstrated as obtainable in a highly practical and useful apparatus.

I claim:

1. In apparatus used for unloading cans from pallets on which they are vertically stacked which apparatus embodies
    a first station containing an elevatable lift onto which pallets stacked with cans are loaded,
    a second station located to one side of said first station containing a discharge conveyor,
    a continuously-moving belt which courses the upper reaches of the first and second stations, and
    means disposed immediately above the course of said belt which attracts the cans to the underside of the belt when the pallet is elevated by the lift to locate the cans within the influence of said can attracting means whereby the cans are separated from the pallet and move with the belt out of the first station into the upper reaches of the second station for release to the discharge conveyor,
the improvement wherein
    said can attracting means is so positioned that its influence on the cans terminates within the discharge station so as to release the cans to the discharge conveyor therebelow,
    said discharge station including magnetic pulley means which continuously rotates on an axis extending transversely of the carrier belt movement and positioned beneath the carrier belt and said termination of the can attracting means such that the bottom end of the cans come under the influence of said rotating magnetic pulley means as their top ends are released from the carrier belt,
    said magnetic pulley means tilting the thus-influenced cans out of their initial vertical disposition as they are released from the carrier belt and temper the free fall of the cans onto the discharge conveyor, and
    associated guide means which direct the released cans onto the discharge conveyor therebelow as the cans are tilted by the magnetic pulley means out of their initial vertical disposition.

2. The apparatus of claim 1 wherein the cans are stacked in tiers on the pallet and the apparatus includes means which halt the elevation of the lift as each tier of cans is raised into the magnetic field of the magnet means.

3. The apparatus of claim 2 including means for returning the lift to its lowered position when the last tier of cans has been pulled by the magnetic means off the pallet.

4. The apparatus of claim 3 including switch means which are located to be engaged by a can-stacked pallet when located on the lift in its lowered position to initiate raising of the lift.

5. The apparatus of claim 3 further including a collector station into which each lowered pallet is pushed by the next pallet as the latter is located on the elevatable lift of the first station.

6. The apparatus of claim 5 wherein the collector station includes a second elevatable lift onto which each lowered pallet is moved, and switch means engaged by the pallet as it is moved onto the second lift, said switch means energizing the second lift to raise the pallet to a storage area and then to return to receive the next pallet.

7. The improvement according to claim 1 wherein the guide means comprise a stripper plate disposed tangentially to the magnetic pulley means and having a notched upper edge, the magnetic pulley means including portions which move through said notched upper edge such that the cans are stripped from the influence of the magnetic pulley means as they approach the discharge conveyor.

8. The improvement according to claim 1 wherein the guide means comprise parallel-spaced walls one of which walls is notched, and the magnetic pulley means includes portions which move through said notches as it rotates such that the cans are stripped from the influence of the magnetic pulley means as they approach the discharge conveyor.

9. Apparatus for unloading in succession cans from pallets on which they are stacked in tiers with separating divider sheets comprising;

a first unloading station containing an elevatable lift onto which each pallet stacked with cans is located when the lift is in its lower position, a second station to one side of said first station containing a conveyor which leads to a can discharge area, a moving belt above said first and second stations which courses across the lift of the first station to above the conveyor of the second station in the upper reaches of said stations, first magnetic means disposed above the course of said moving belt in the upper regions of said first station which attract each tier of cans and divider sheet into contact with the moving belt as said tier of cans is raised by the lift into the influence of the magnetic means, the tier of cans and divider sheets being thereby held in contact with the moving belt so as to move therewith to the second station and permit the lift to rise further to locate the next tier of cans and its overlying divider sheet into the influence of the magnetic means to continue the removal of the tier of cans, the influence of the first magnetic means terminating over the second station short of the full course of the moving belt such that the cans of each tier are carried by the moving belt beyond the influence of the first magnetic means and released onto the conveyor leading to the can discharge area, second magnetic means in the second station which are aligned with the conveyor therebetween and the moving belt to which the bottom ends of the cans are attracted as the top ends of the cans are released from the magnetic field of the first magnetic means, and guide means which lead the released cans to the conveyor, a divider sheet collection area located beyond said second station and in line with the course of the moving belt to receive the divider sheets as the tiers of cans moving with the belt are carried beyond the influence of the magnetic means, and a third station into which the empty pallets are discharged when the lift is returned to its lowered station to receive the next pallet stacked with cans.

10. The apparatus of claim 9 wherein the moving belt is continuous and the magnetic means is located between the upper and lower courses thereof.

11. The apparatus of claim 9 wherein the second magnetic means embodies a continuously rotating magnetic pulley to which the bottom end of the cans are attracted upon release from the moving belt, said rotating magnetic pulley tilting the cans from a vertical disposition to a horizontal disposition as it rotates, while tempering the free fall of the cans to the conveyor, and stripper means separating the cans from the magnet as they are tilted into a horizontal disposition.

12. The apparatus of claim 11 further including spacer means which retain the horizontally tilted cans in that disposition as they drop from the rotating magnet onto the conveyor.

13. The apparatus of claim 9 wherein the third station includes a second lift adapted to rise from a lower position to an upper level and return thereto, the second lift in its lower position being located to receive an empty pallet from the elevatable lift in the second station when another can-stacked pallet is moved thereon, overhead storage means spaced above said lower position and below said upper level of the second lift for storing empty pallets, and switch means actuated by the empty pallet when located on the second lift which initiate said rise and return of the second lift and discharge the empty pallet therefrom to the overhead storage means.

* * * * *

UNITED STATES PATENT AND TRADEMARK OFFICE
CERTIFICATE OF CORRECTION

PATENT NO. : 4,358,236
DATED : November 9, 1982
INVENTOR(S) : Robert G. Dudley

It is certified that error appears in the above—identified patent and that said Letters Patent is hereby corrected as shown below:

Column 4, line 39: "23" should be -- 28 --

Column 5, line 2: "casing" should be -- causing --

Column 7, line 25: "16" should be -- 116 --

Signed and Sealed this

Eighth Day of February 1983

[SEAL]

Attest:

GERALD J. MOSSINGHOFF

Attesting Officer

Commissioner of Patents and Trademarks